(12) United States Patent
Wang et al.

(10) Patent No.: US 11,573,930 B2
(45) Date of Patent: Feb. 7, 2023

(54) SELF-HEALING DATA SYNCHRONIZATION

(71) Applicant: Zuora, Inc., Redwood City, CA (US)

(72) Inventors: Liangqi Wang, Pleasanton, CA (US); Junyi Song, San Mateo, CA (US); Sean Mahbod, Los Altos Hills, CA (US)

(73) Assignee: Zuora, Inc., Redwood City, CA (US)

( * ) Notice: Subject to any disclaimer, the term of this patent is extended or adjusted under 35 U.S.C. 154(b) by 247 days.

(21) Appl. No.: 16/891,347

(22) Filed: Jun. 3, 2020

(65) Prior Publication Data

US 2020/0379952 A1 Dec. 3, 2020

Related U.S. Application Data

(60) Provisional application No. 62/856,702, filed on Jun. 3, 2019.

(51) Int. Cl.
*G06F 16/00* (2019.01)
*G06F 16/178* (2019.01)
(Continued)

(52) U.S. Cl.
CPC ........ *G06F 16/178* (2019.01); *G06F 11/0772* (2013.01); *G06F 11/1658* (2013.01);
(Continued)

(58) Field of Classification Search
CPC .............. G06F 16/178; G06F 16/2322; G06F 16/1734; G06F 16/275; G06F 16/1787;
(Continued)

(56) References Cited

U.S. PATENT DOCUMENTS 7,627,729 B2 * 12/2009 Bartfai ................ G06F 11/2082
711/165
8,572,022 B2 * 10/2013 Hagan ................... G06F 16/178
707/610

(Continued)

FOREIGN PATENT DOCUMENTS

WO WO2014105373 A1 * 7/2014
WO WO2014193458 A1 * 12/2014
(Continued)

OTHER PUBLICATIONS

Vaibhav Gogte et al., "Persistency for Synchronization-Free Regions", ACM SIGPLAN Notices vol. 53 Issue 4 Apr. 2018 pp. 46-61.*

*Primary Examiner* — Srirama Channavajjala
(74) *Attorney, Agent, or Firm* — Sheppard, Mullin, Richter & Hampton LLP

(57) ABSTRACT

A self-healing data synchronization process includes an initial stage in which a collection of data change events is received, a set of data record(s) corresponding to the data change event(s) is identified, and a syncing of the set of data record(s) is initiated. Data that indicates which data record(s) successfully synced and which failed is stored. During a subsequent stage of the self-healing process, data change events that occurred during a preceding time horizon are identified, a corresponding first set of data record(s) are identified, a difference between the first set and a second set of data record(s) that successfully synced during the time horizon is determined as a third set of data record(s), and any data record that was attempted to be synced during the time horizon but failed is excluded from the third set. A sync of any data record remaining in the third set is then initiated.

17 Claims, 7 Drawing Sheets

(51) Int. Cl.
*G06F 16/17* (2019.01)
*G06F 11/16* (2006.01)
*G06F 11/07* (2006.01)
*G06F 16/23* (2019.01)
*G06F 16/11* (2019.01)
*G06F 16/21* (2019.01)

(52) U.S. Cl.
CPC ........ *G06F 16/128* (2019.01); *G06F 16/1734* (2019.01); *G06F 16/214* (2019.01); *G06F 16/2322* (2019.01); *G06F 16/2379* (2019.01)

(58) Field of Classification Search
CPC .... G06F 16/273; G06F 16/27; G06F 11/0772; G06F 11/1658; G06F 16/128; G06F 16/2379; G06F 16/214; G06F 11/2082; G06F 11/3006
See application file for complete search history.

(56) References Cited

U.S. PATENT DOCUMENTS

| | | | |
|---|---|---|---|
| 10,417,190 B1* | 9/2019 | Donlan | G06F 16/128 |
| 2002/0129290 A1* | 9/2002 | Couillard | H04L 63/12 |
| | | | 713/400 |
| 2006/0218206 A1* | 9/2006 | Bourbonnais | G06F 16/2379 |
| 2006/0242206 A1* | 10/2006 | Brezak | G06F 16/1787 |
| 2007/0179986 A1* | 8/2007 | Adam | G06Q 10/06 |
| 2008/0276239 A1* | 11/2008 | Collins | G06F 11/1471 |
| | | | 718/101 |
| 2011/0173294 A1* | 7/2011 | Jackson | H04L 12/14 |
| | | | 709/217 |
| 2012/0143819 A1* | 6/2012 | Tan | G06F 16/27 |
| | | | 707/626 |
| 2015/0046393 A1* | 2/2015 | Kamal | G06F 16/275 |
| | | | 707/610 |
| 2015/0213099 A1* | 7/2015 | Rinke | G06F 16/2365 |
| | | | 707/634 |
| 2017/0177613 A1* | 6/2017 | Sharma | G06F 21/45 |
| 2018/0007112 A1* | 1/2018 | Åkerfeldt | H04N 21/2365 |
| 2018/0101607 A1* | 4/2018 | Yoon | G06F 11/3006 |
| 2018/0246927 A1* | 8/2018 | Garcia-Arellano | |
| | | | G06F 16/2379 |
| 2018/0341560 A1* | 11/2018 | Lu | G06F 16/214 |

FOREIGN PATENT DOCUMENTS

| | | |
|---|---|---|
| WO | WO 2016067520 A1 * | 5/2016 |
| WO | WO2019133229 A1 * | 7/2019 |

* cited by examiner

SELF-HEALING DATA SYNCHRONIZATION

CROSS-REFERENCE TO RELATED APPLICATION(S)

This application claims the benefit of U.S. Provisional Patent Application No. 62/856,702, filed on Jun. 3, 2019, entitled "Data Connect Self-Healing Using Carousel," which is hereby incorporated by reference herein.

TECHNICAL FIELD

This disclosure pertains to multi-tenant computing systems, and more particularly, in some example embodiments, to self-healing data synchronization in multi-tenant computing systems.

BACKGROUND

In computing systems, the contents of a datastore may need to be copied to another datastore periodically or in response to modification of the contents. For example, data may need to be synced from a first one or more datastores forming part of a first computing system to a second one or more datastores forming part of a second computing system in scenarios in which each system relies on the data. In some scenarios, some data that requires syncing may not be accurately identified, and thus, may not be synced to the second computing system, leading to discrepancies between the synced data stored at the second computing system and the data stored at the first computing system. Discussed herein are technical solutions that address this and other technical problems associated with data syncing scenarios.

SUMMARY

In an example embodiment, a computer-implemented method for syncing data from a first computing system to a second computing system is disclosed. The computer-implemented method includes identifying a collection of data change events occurring over a period of time corresponding to a time horizon and identifying a first set of data records corresponding to the collection of data change events, the first set of data records being stored at the first computing system. The method further includes accessing a first data structure storing sync information, the sync information indicating a second set of data records that were successfully synced from the first computing system to the second computing system over the period of time corresponding to the time horizon and comparing the first set of data records and the second set of data records to determine a third set of one or more data records, each data record in the third set of one or more data records being present in the first set of data records and absent from the second set of data records. The method additionally includes retrieving the third set of one or more data records from a first one or more datastores of the first computing system and initiating a syncing of the third set of one or more data records to a second one or more datastores of the second computing system.

In an example embodiment, the collection of data change events is a second collection of data change events, and the method further includes receiving, in real time over the period of time corresponding to the time horizon, a first collection of data change events from an upstream data service and identifying a fourth set of data records corresponding to the first collection of data change events. In an example embodiment, the method additionally includes initiating a syncing of the fourth set of data records from the first computing system to the second computing system, determining, from the fourth set of data records, the second set of data records that were successfully synced from the first computing system to the second computing system over the period of time corresponding to the time horizon, and writing the sync information to the first data structure.

In an example embodiment, the second collection of data change events includes one or more data change events absent from the first collection of data change events.

In an example embodiment, identifying the second collection of data change events occurring over the time horizon includes accessing a bin log comprising a collection of bin log files representative of data change events, ordering the bin log files based at least in part on respective timestamps associated with the data change events, and identifying each data change event having a respective timestamp that falls within the period of time corresponding to the time horizon.

In an example embodiment, the method further includes monitoring, by the upstream data service, the bin log over the period of time corresponding to the time horizon to identify the first collection of data change events.

In an example embodiment, the one or more data change events are absent from the first collection of data change events due, at least in part, to downtime of the upstream data service during at least a portion of the period of time corresponding to the time horizon.

In an example embodiment, the upstream data service is configured to convert tabular data to object data and the one or more data change events are absent from the first collection of data change events due, at least in part, to a data conversion error by the upstream data service.

In an example embodiment, the method further includes determining that a fifth set of one or more data records in the fourth set of data records failed to successfully sync to the second computing system and writing sync failure information to a second data structure, the sync failure information indicating the fifth set of one or more data records that failed to successfully sync.

In an example embodiment, the method further includes prior to retrieving the third set of one or more data records, accessing the second data structure to identify the fifth set of one or more data records and removing the fifth set of one or more data records from the third set of one or more data records.

In an example embodiment, each data record in the first set of data records is a new data record created during the period of time corresponding to the time horizon or an existing data record that was modified during the period of time corresponding to the time horizon.

In an example embodiment, a system configured to sync data from a first computing system to a second computing system is disclosed. The system includes at least one processor and at least one memory storing computer-executable instructions. The at least one processor is configured to access the at least one memory and execute the computer-executable instructions to perform a set of operations including identifying a collection of data change events occurring over a period of time corresponding to a time horizon and identifying a first set of data records corresponding to the collection of data change events, the first set of data records being stored at the first computing system. The set of operations further includes accessing a first data structure storing sync information, the sync information indicating a second set of data records that were successfully synced from the first computing system to the second computing system over the period of time corresponding to the time horizon and comparing the first set of data records and the second set of data records to determine a third set of one or more data records, each data record in the third set of one or more data records being present in the first set of data records and absent from the second set of data records. The set of operations additionally includes retrieving the third set of one or more data records from a first one or more datastores of the first computing system and initiating a syncing of the third set of one or more data records to a second one or more datastores of the second computing system.

The above-described system is further configured to perform any of the operations/functions and may include any of the additional features/aspects of example embodiments of the invention described above in relation to example computer-implemented methods of the invention.

In an example embodiment, a computer program product for syncing data from a first computing system to a second computing system is disclosed. The computer program product includes a non-transitory computer-readable medium readable by a processing circuit. The non-transitory computer-readable medium stores instructions executable by the processing circuit to cause a method to be performed. The method includes identifying a collection of data change events occurring over a period of time corresponding to a time horizon and identifying a first set of data records corresponding to the collection of data change events, the first set of data records being stored at the first computing system. The method further includes accessing a first data structure storing sync information, the sync information indicating a second set of data records that were successfully synced from the first computing system to the second computing system over the period of time corresponding to the time horizon and comparing the first set of data records and the second set of data records to determine a third set of one or more data records, each data record in the third set of one or more data records being present in the first set of data records and absent from the second set of data records. The method additionally includes retrieving the third set of one or more data records from a first one or more datastores of the first computing system and initiating a syncing of the third set of one or more data records to a second one or more datastores of the second computing system.

The above-described computer program product is further configured to perform any of the operations/functions and may include any of the additional features/aspects of example embodiments of the invention described above in relation to example computer-implemented methods of the invention.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
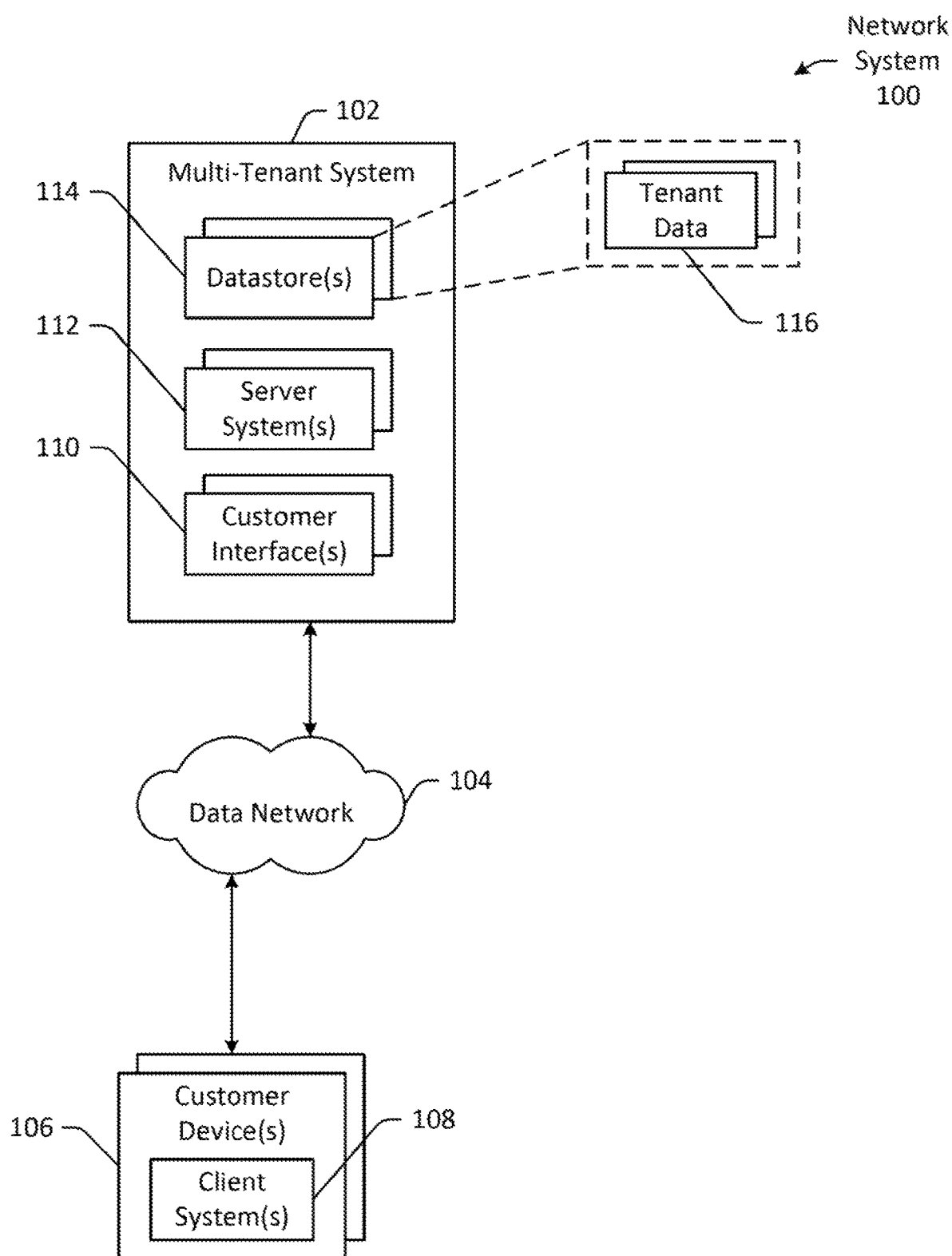
FIG. 1 depicts an example network system configured to provide cloud-based software-as-a-service (SaaS) services of a multi-tenant system to multiple tenants in accordance with example embodiments of the invention.

Multiple disparate computing systems often rely and operate on respective copies of the same dataset. It is therefore important to ensure that different versions of a dataset maintained by different computing systems are up-to-date and synced with one another. Real time or near real time syncing of data from one computing system to another computing system and/or periodic syncing at designated intervals ensures that modifications made to the data and/or newly generated data at one computing system are propagated to another computing system and that the systems do not access and/or otherwise rely upon conflicting data.

In example embodiments of the invention, a multi-tenant system may store respective tenant data for each of multiple tenants and may be configured to provide cloud-based SaaS services to each of the tenants. In connection with providing such services, the multi-tenant system may access, modify, and/or generate tenant data. In addition, the multi-tenant system may sync tenant data to a target computing system such as another cloud-based system utilized by multiple tenants, a computing system associated with a specific tenant, or the like. The syncing of data from the multi-tenant system to the target computing system may occur continuously in real time or near real time, periodically according to a predetermined sync schedule, and/or on-demand in response to a request received from the target computing system.

For instance, in example embodiments, a synchronization engine may receive data change events from one or more upstream data services. The data change events may correspond to modifications made to existing tenant data and/or may correspond to newly generated tenant data. The synchronization engine may receive the data change events in real time or near real time as they are generated by the upstream service(s) based on the underlying changes to the tenant data. The synchronization engine may be configured to identify the modified/new tenant data based on the received data change events and sync the identified data to a target computing system. In some example embodiments, a respective synchronization engine may be configured for each tenant to sync that tenant's corresponding tenant data. In other example embodiments, a synchronization engine may be configured to handle the syncing of tenant data for multiple tenants.

In example embodiments, a synchronization engine may receive data change events in real time or near real time, identify modified/new tenant data corresponding to the data change events, and initiate syncs of the identified data to a target computing system. A data change event may refer to a notification sent by an upstream data service to a synchronization engine that is indicative of an underlying change to tenant data (i.e., a modification to existing tenant data or newly generated tenant data) and/or the underlying data change itself. In some example embodiments, a synchronization engine may identify and sync tenant data continuously as the corresponding data change events are received. In other example embodiments, a synchronization engine may receive data change events in batch or may aggregate data change events received over a period of time and identify and sync the corresponding tenant data at sync intervals according to a predetermined sync schedule. In yet other example embodiments, a synchronization engine may initiate a sync of tenant data to a target computing system in response to a request received from the target system and based on data change events received since a most recent request from the target system. While example embodiments of the invention may be described herein in connection with continuous data syncing based on data change events received in real time or near real time, it should be appreciated that techniques described herein are also applicable to the other synchronization scenarios mentioned above and that such other scenarios are also within the scope of embodiments of the invention.

In example embodiments, as data change events are received from an upstream data service, a synchronization engine may identify tenant data corresponding to the data change events, retrieve the identified data, and initiate a sync of the data to a target computing system. Ideally, the data change events received by the synchronization engine over any given period of time would include all actual data change events that have occurred over that period of time. That is, ideally, the received data change events would reflect all instances of modifications made to existing tenant data and all newly created tenant data. Oftentimes, however, the collection of data change events received by a synchronization engine over a period of time may not accurately reflect all actual data change events. This may occur for a variety of reasons. For instance, downtime of an upstream service, a bug or other processing error associated with functionality of an upstream service, or the like may result in an upstream service failing to identify/generate one or more data change events, and thus, failing to inform a synchronization engine of such one or more data change events. As a result, a synchronization engine, which is configured to identify data to be synced based on the received data change events, may miss certain data that needs to be synced because corresponding data change events reflective of that data have not been received. This creates the technical problem of data inconsistency between the multi-tenant system and the target computing system.

Various embodiments of the invention provide technical solutions that overcome technical problems specifically arising in the realm of computer-based technology, and more specifically, in the realm of data transfer technology, and thus, represent an improvement to computer technology. In particular, example embodiments of the invention provide technical solutions that solve the technical problem of data inconsistency between a first computing system and a second computing system that may result from issues experienced by upstream data services (e.g., downtime, bugs, processing errors, etc.) of the first computing system that cause data change events to go undetected, thereby causing certain data corresponding to the undetected data change events to not be synced to from the first computing system to the second computing system.

Example embodiments of the invention provide a technical solution to the aforementioned technical problem by providing a self-healing synchronization engine configured to identify data corresponding to previously undetected data change events that occurred over the course of a time period corresponding to a time horizon and sync the data corresponding to the previously undetected data change events from a first computing system (e.g., a multi-tenant computing system) to a second computing system (e.g., a target computing system) in order to maintain data consistency between the computing systems. In example embodiments, the self-healing synchronization engine may include various sub-engines configured to execute various respective functionality of the self-healing synchronization process including a scanning engine and a sync discrepancy determination engine.

In example embodiments, a synchronization engine associated with a first computing system (e.g., a multi-tenant system) may identify a set of data records corresponding to a collection of data change events received from an upstream data service and may initiate a syncing of the identified tenant data to a second computing system (e.g. a target cloud-based computing system). Sync information identifying those data records that are successfully synced to the target computing system may be stored in a data structure such as a synced data mapping. The synced data mapping may identify each data record that was successfully synced using, for example, a key-value mapping that links an identifier of the data record, an identifier at the first computing system for a tenant with which the data record is associated, and/or an identifier at the second computing system for the tenant. In some example embodiments, the synced data mapping may be indexed by the data record identifier. In some example embodiments, if data corresponding to any field of a data record has been modified, then only those modified data field(s) may be synced. In other example embodiments, if any data field of a data record has been modified, the entire data record may be synced including unchanged data field(s). Similarly, in some example embodiments, a data record may be identified in the synced data mapping only if all data fields for which syncing was attempted were successfully synced. In other example embodiments, respective sync information for each successfully synced data field of a data record may be stored in the synced data mapping. It should be appreciated that any discussion herein of identifying and initiating a syncing of entire data records (regardless of the number of data record fields that were actually modified or created/populated with data) includes example embodiments in which only the individual data record fields that are modified or created/populated with data are identified and synced.

As previously noted, the synchronization engine may identify data records to be synced based on a collection of data change events received on a real time or near real time basis and may initiate syncing of the identified data records on a real time or near real time basis. This may be referred to herein as an initial stage of the self-healing data synchronization process. However, due to various potential issues with upstream data services (e.g., downtime, bugs, processing errors, etc.), one or more actual data change events may go undetected, and thus, the synchronization engine, which is unaware of such data change event(s), may fail to initiate synchronization of corresponding data records. A self-healing synchronization engine may be provided to identify, as part of a subsequent stage of the self-healing data synchronization process, data records corresponding to the undetected data change events that occurred over a prior time period corresponding to a selected time horizon. The self-healing synchronization engine may inform the synchronization engine of these data records which correspond to previously undetected data change events that occurred over the time period corresponding to the time horizon, and the synchronization engine may initiate a syncing of the data records during the subsequent stage of the self-healing data synchronization process. In this manner, any data inconsistency that occurred during the time period corresponding to the time horizon between data stored at the first computing system (e.g., the syncing system) and data stored at the second computing system (e.g., the target system) may be remedied. In example embodiments, the time horizon may be selectively configurable. The time horizon may correspond to any suitable period of time (e.g., 24 hours, 12 hours, 1 hour, etc.). In some example embodiments, the time horizon may be selected based on the number of data change events that were received during a time period corresponding to the time horizon; based on the number of data records that successfully synced during the time period corresponding to the time horizon; or the like.

In example embodiments, a scanning engine of the self-healing synchronization engine may perform a scan to determine a collection of data change events that occurred during a time period corresponding to a selected time horizon. For instance, in example embodiments, the scanning engine may scan a bin log containing a collection of bin log files indicative of data change events associated with tenant data. Each log file may be indicative of a corresponding data change event. The scanning engine may order the bin log files based on respective timestamps of the data change events and may identify the collection of data change events that occurred during the time period corresponding to the time horizon (e.g., during the preceding 24 hours). The scanning engine may then scan the tenant data to identify a first set of data records corresponding to the identified collection of data change events. The scanning engine may provide an indication of the identified first set of data records (e.g., data record identifiers) to the sync discrepancy determination engine.

In example embodiments, the sync discrepancy determination engine may perform a comparison of the first set of data records to a second set of data records identified in sync information stored in the synced data mapping. In some example embodiments, the synced data mapping may be cleaned/refreshed (e.g., all sync information stored therein may be deleted) after each subsequent stage of the self-healing synchronization process. As such, the synced data mapping may only contain sync information corresponding to data records that were successfully synced over the course of a time period corresponding to the selected time horizon, in which case, the sync discrepancy determination engine may perform a direct comparison of the first set of data record(s) to a second set of successfully synced data record(s) identified in the synced data mapping to identify a difference there between. In other example embodiments, the synced data mapping may store sync information corresponding to successfully synced data records over a time period that extends beyond the selected time horizon, in which case, the sync discrepancy determination engine may first order the sync information based on respective timestamps indicative of when corresponding data records were successfully synced and may select, as the second set of data records, those data records that were successfully synced during a time period corresponding to the selected time horizon.

In example embodiments, the sync discrepancy determination engine may identify a third set of data records corresponding to a set difference between the first set of data records (e.g., the set of data record(s) associated with all data change event(s) that occurred during the time period corresponding to the time horizon) and the second set of data records (e.g., the set of data record(s) that were successfully synced during the time period corresponding to the time horizon). If the third set of data records is not null, this indicates that syncing was not initiated for one or more data records for which syncing should have been initiated during the time period corresponding to the time horizon. The sync discrepancy determination engine may send an indication of the third set of data record(s) to the synchronization engine which, in turn, may retrieve and initiate syncing of the third set of data record(s). In this manner, a self-healing synchronization is achieved, whereby data records that were modified or created during the time period corresponding to the time horizon, but for which syncing was not attempted, are identified and synced. As previously noted, these data record(s) may not have been identified because the synchronization engine may have been unaware of the corresponding data change event(s) due to various technical issues (e.g., downtime, bugs, processing errors, etc.) that may have affected one or more upstream data services. This self-healing data synchronization process thus obviates the technical problem of data inconsistency between the syncing system and the target system that would otherwise result from these various technical issues that can impact one or more upstream data services.

In some example embodiments, attempted syncs of one or more data records may fail during the initial stage of the self-healing data synchronization process. These attempted syncs may fail due to issues associated with the target computing system (e.g., downtime of the target system, a bug affecting the target system, etc.). Sync failure information indicative of those data record(s) that failed to successfully sync may be stored in a sync failure list. While this data structure is illustratively referred to as a sync failure list, it should be appreciated that any suitable data structure may be employed (e.g., a queue, an array, etc.). In some example embodiments, any data record(s) identified in the sync failure list that are also present in the third set of data records (where the third set of data record(s) represents the difference between the first set of data record(s) corresponding to all data change event(s) over the time period corresponding to the selected time horizon and the second set of data record(s) corresponding to all successfully synced data record(s) over the time period), may be excluded/removed from the third set of data records prior to retrieving the third set of data records and initiating syncing thereof. Stated another way, re-syncing of any data record that failed to successfully sync during the initial stage of the self-healing data synchronization process may not be attempted during the subsequent stage of the self-healing data synchronization process. Rather, the syncing computing system may inform the target computing system of the data record(s) that failed to successfully synced, and the target system may request and/or initiate re-syncing of the data record(s) after any issues that resulted in the sync failure are resolved. In example embodiments, as with the synced data mapping, the sync failure list may be cleaned/refreshed after each subsequent stage of the self-healing data synchronization process.

FIG. 1 depicts a diagram of an example network system 100 for providing cloud-based SaaS services of a multi-tenant system 102 to multiple tenants according to some example embodiments. Examples of such cloud-based SaaS services include data storage, data processing, and business-oriented applications. In some example embodiments, each tenant may be a subscription-based entity or provider (e.g., an internet service provider, a home security system and service provider, a cellular phone service provider, an entertainment content provider, etc.). A respective group of one or more users (e.g., individuals, business entities, customers of the business entities, systems, etc.) may share access to the cloud-based services provided to each tenant by the multi-tenant system 102. In some example embodiments, a tenant corresponds to a service entity such as AT&T, Netflix, Verizon, and/or the like. In some example embodiments, a tenant may correspond to one or more products or services offered by an entity. For example, in an example embodiment, AT&T interne products and AT&T security products may be separate and distinct tenants. In some example embodiments, the cloud-based SaaS services relate to managing subscriber records, product and/or service consumption information, billing information, payment information, and/or the like.

The network system 100 includes the multi-tenant system 102 coupled via a data network 104 (e.g., a set of one or more public and/or private, wired and/or wireless networks) to client devices 106. The multi-tenant system 102 includes shared resources for hosting the cloud-based SaaS services provided to the tenants. The shared resources may include processors, memory, virtual systems, services, application programs, load balancers, firewalls, and so forth. As depicted in FIG. 1, the multi-tenant system 102 may include tenant interfaces 110, server systems 112, and datastores 114. Each of the client devices 106 may include a client system 108 that accesses the cloud-based SaaS services hosted by the multi-tenant system 102. In example embodiments, the client systems 108 may be operated by employees (e.g., administrator users) of the provider of the multi-tenant system 102; by employees of the tenants; and/or by end users of the tenants' services.

Each client device 106 may include a personal computing device such as a desktop computer, a laptop computer, a notebook, a tablet, a personal digital assistant (PDA), a smartphone, a wearable computing device, and/or any other consumer electronic device incorporating one or more computer components. The client system 108 on each client device 106 may include hardware, software, and/or firmware for communicating with the multi-tenant system 102 and accessing the cloud-based services hosted by the multi-tenant system 102. Examples of the client systems 108 may include, without limitation, web browsers, client engines, drivers, user interface components, proprietary interfaces, and so forth.

The multi-tenant system 102 may include hardware, software, and/or firmware for hosting cloud-based services for tenants. In example embodiments, the multi-tenant system 102 may offer access to shared resources including systems and applications on shared devices and may offer each tenant the same quality or may offer different tenants varying qualities of service. In some example embodiments, the multi-tenant system 102 may not use virtualization or instantiation processes. In some example embodiments, the multi-tenant system 102 may integrate several business computing systems into a common system with a view toward streamlining business processes and increasing efficiencies on a business-wide level.

In some example embodiments, the multi-tenant system 102 includes a user interface tier of multiple tenant interfaces 110, a server tier of multiple server systems 112, and a datastore tier of multiple datastores 114 for the multiple tenants. In some example embodiments, the tenant interfaces 110 may include graphical user interfaces and/or web-based interfaces to enable tenants to access the shared services hosted by the multi-tenant system 102. The tenant interfaces 110 may support load balancing when multiple tenants (and/or multiple customers of the tenants) attempt to access the multi-tenant system 102 concurrently. The tenant interfaces 110 may additionally or alternatively include an operator interface for use by a systems operator to configure or otherwise manage configuration settings or the like the multi-tenant system 102. In some example embodiments, to support load balancing, each tenant may be associated with a subset of the total number of tenant interfaces 110.

In some example embodiments, the server systems 112 may include hardware, software, and/or firmware configured to host the shared services for tenants. The hosted services may include tenant-specific business services or functions, including enterprise resource planning (ERP) services; customer relationship management (CRM) services; eCommerce services; Human Resources (HR) management services; financial services including, for example, payroll services, accounting services, subscription billing services, financial reporting and analysis services, or the like; calendaring services; order processing services; inventory management services; supply chain management (SCM) services; collaboration services; sales force automation (SFA) services; marketing automation services; support services including, for example, contact list management services, call-center support services, web-based customer support services, or the like; partner and vendor management services; product lifecycle management (PLM) services; and so forth. Similar to the tenant interfaces 110, in some example embodiments, the server systems 110 may support load balancing when multiple tenants (and/or multiple customers of tenants) attempt to access the multi-tenant system 102 concurrently. Further, in some example embodiments, each tenant may be associated with a subset of the total number of server systems 112 to support load balancing.

In some example embodiments, tenant data 116 for each tenant may be stored in a logical store across one or more datastores 114. In some example embodiments, each tenant uses a logical store that is not assigned to any predetermined datastores 114. Each logical store may contain tenant data 116 that is used, generated, and/or stored as part of providing tenant-specific business services or functions. In some example embodiments, the datastores 114 may include relational database management systems (RDBMS), object-based database systems, or the like. In some example embodiments, tenant data 116 may be stored across multiple datastores 114, with each datastore dedicated to a particular service (e.g., managing customer records, managing product and/or service consumption information, managing billing information, managing payment information, etc.).

In some example embodiments, the tenant data 116 may include subscription information, such as billing data and/or subscription status data (e.g., active, canceled, suspended, re-activated). Billing data may include billing invoice data (e.g., date of invoices and invoice amounts, overage charge dates and overage charge amounts, etc.); payment transaction data (e.g., date of payments, amount of payments, etc.); payment method data (e.g., stored credit card/debit card information); payment plan data (e.g., annual billing, monthly billing, etc.); and/or service plan data (e.g., the name of a service plan). Subscription information may also include a geographic region and/or location information associated with a tenant, service, and/or subscriber. In some example embodiments, the tenant data 116 may include usage data (e.g., account activity data), such as data identifying new subscriptions; changes to subscribed products and/or services; cancellation of one or more products and/or services; subscriptions to new products and/or services as part of an existing subscription; application of discounts; loyalty program package changes (e.g., additional programs and/or services, special rates, or the like for loyal customers); reduction or increase of rates for products and/or services; and/or cancellation of a subscription. In some example embodiments, account activity data may include data indicative of subscriber product usage data (e.g., what channels the subscriber actually watches, what services and what level of consumption the subscriber receives, quality of the product and/or services, etc.).

In some example embodiments, the tenant data 116 may be stored in one or more data formats according to one or more data schemas. For example, subscription tenant data may be stored in a particular format and usage tenant data may be stored in another format. As used herein, data formats, or simply formats, may include data types; variable types; protocols (e.g., protocols for accessing, storing, and/or transmitting data); programming languages; scripting languages; data value parameters (e.g., date formats, string lengths, etc.); endpoint locations; and so forth. In some example embodiments, the tenant data 116 may be stored as data objects as part of an object-oriented data schema. The tenant data 116 may include parent data objects, where each parent data object is related to one or more child data objects via a parent-child dependency relationship. Any given parent data object may, in turn, be a child data object to one or more other parent data objects. Similarly, any given child data object may, in turn, be a parent data object to one or more other child data objects. In some example embodiments, the tenant data 116 may include tabular data including one or more database tables and corresponding tabular data contained therein. Tabular data of the tenant data 116 may be linked to corresponding object data of the tenant data 116.

In some example embodiments, the multi-tenant system 102 functions to provide uniform access to disparate services (e.g., microservices) and/or disparate datastores. For example, different services of the multi-tenant system 102 may manage (e.g., create, read, update, delete) tenant data 116 stored in different datastores 114. It will be appreciated that as used herein, a "service" may be single service and/or a set of services (e.g., a cluster of services). The datastores 114 may store data in different formats and/or the services may handle data differently. The services may each include a service provider interface (SPI) that provides data from the service and/or that receives data at the service in a common (or uniform) format, regardless of the original format that may be used by the service and/or datastores 114. In some example embodiments, the multi-tenant system 102 may define a uniform access specification that defines the common format that the services must comport with when receiving and/or providing data. Accordingly, each of the services may be accessed in a uniform manner, and data may be consumed from the services in a uniform manner, regardless of the internal specifications and/or operations of the service.

The data/communication network 104 may represent one or more types of computer networks (e.g., a local area network (LAN), a wide area network (WAN), etc.) and/or underlying transmission media. The data network 104 may provide communication between the systems, engines, datastores, components, and/or devices described herein. In some example embodiments, the data network 104 includes one or more computing devices, routers, cables, buses, and/or other network topologies (e.g., mesh network topologies). In some example embodiments, the data network 104 may include one or more wired and/or wireless networks. In various example embodiments, the data network 104 may include the Internet, one or more WANs, one or more LANs, and/or one or more other public, private, Internet Protocol (IP)-based, and/or non-IP-based networks.

Illustrative Embodiments

Figure 2A:
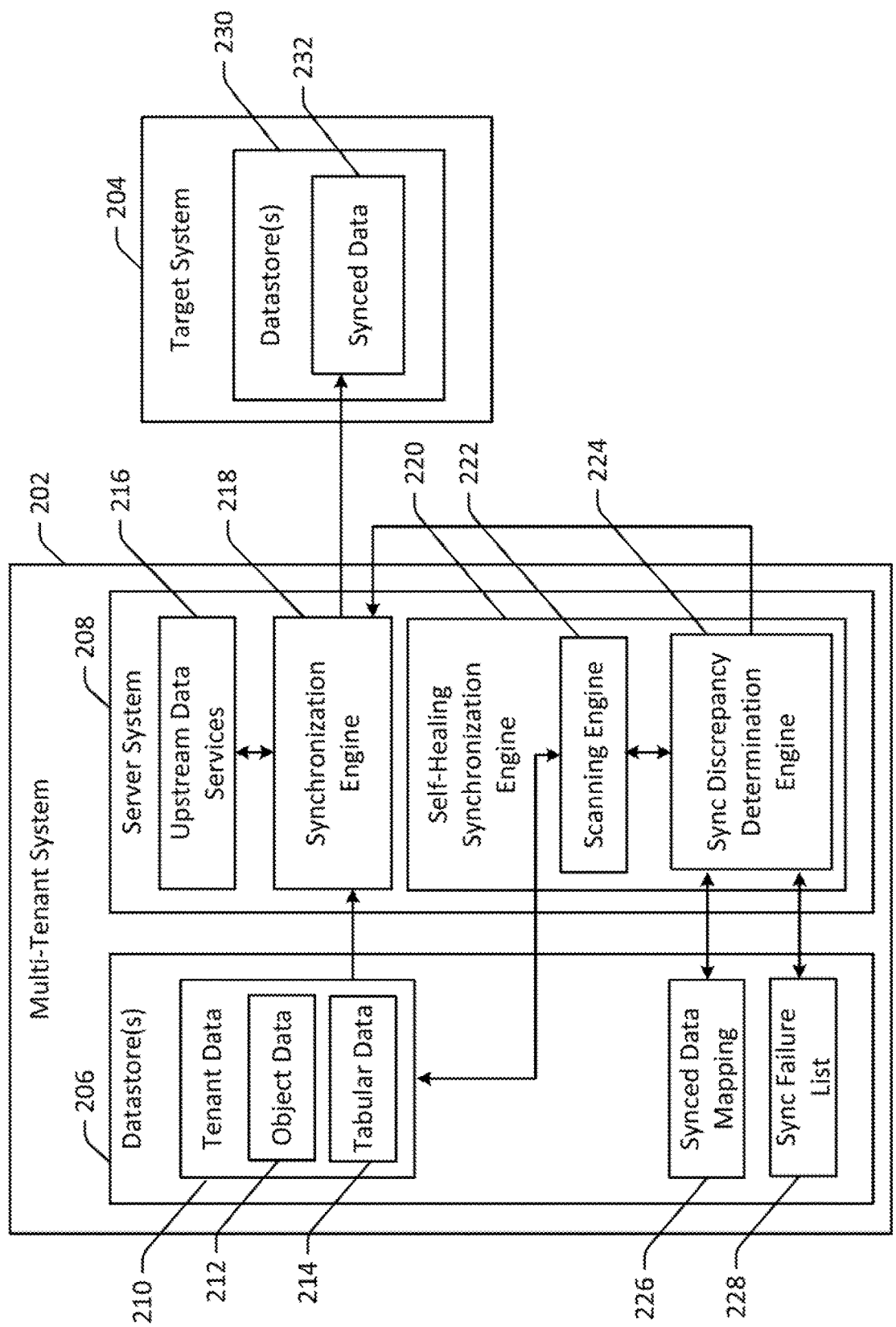
FIG. 2A depicts example components of a multi-tenant system that are configured to perform self-healing synchronization of tenant data from the multi-tenant system to a target computing system in accordance with example embodiments of the invention.

FIG. 2A depicts an example multi-tenant system 202 (which may be a particular implementation of the multi-tenant system 102 depicted in FIG. 1), an example target computing system 204, and example components of the multi-tenant system 202 that are configured to perform a self-healing data synchronization process in accordance with example embodiments of the invention. The target computing system 204 may be another cloud-based system. The target system 204 may be integrated with the multi-tenant system 202 such that tenant data 210 hosted at the multi-tenant system 202 is shared/synced with the target system 204. For instance, both the multi-tenant system 202 and the target system 204 may each provide cloud-based services to one or more of the same tenants, and as such, may each host and operate on the same tenant data 210. For illustrative purposes, the tenant data 210 represents a portion of the tenant data 116 (FIG. 1) that corresponds to a particular tenant of the multi-tenant system 202. The tenant data 210 may be stored in one or more datastores 206, which may represent at least a portion of the datastore(s) 114. While functionality of the example components depicted in FIG. 2 that facilitate the self-healing data synchronization process described herein are described with respect to the tenant data 210 corresponding to a particular tenant, it should be appreciated that the example components can operate on respective tenant data associated with multiple tenants. Alternatively, a respective instance of each such component may be provided to facilitate the self-healing data synchronization process with respect to respective tenant data associated with each tenant of the multi-tenant system 202.

In example embodiments, the tenant data 210 may include object data 212 and tabular data 214. The object data 212 may include various types of data objects which may be related to one another through one or more types of dependencies. For example, the object data 212 may include parent data objects, each of which may be related to one or more child data objects via respective parent-child dependencies. One or more parent data objects may themselves be child data objects to one or more other parent data objects.

Similarly, one or more child data objects may themselves be parent data objects to one or more other child data objects. In example embodiments, the tabular data 214 may include one or more database tables as well as corresponding data contained therein. An upstream data service of one or more upstream data services 216 may be configured to perform a conversion of the tabular data 214 to the object data 212.

In example embodiments, the upstream data services 216 may reside and execute on a server system 208, which may be comprised of one or more of the server systems 112. The upstream data services 216 may include a variety of different types of services including, without limitation, a service configured to monitoring a bin log comprising a set of binary log files indicative of all data change events (e.g., modifications to existing tenant data, generation of new tenant data, etc.); a service for converting tabular data to object data; one or more services for performing various types of pre-synchronization processing on tenant data; and so forth.

One or more engines configured to facilitate various aspects of a self-healing data synchronization process in accordance with example embodiments of the invention may also reside and execute on the server system 208. For instance, a synchronization engine 218 may be provided that—as part of an initial stage of a self-healing synchronization process disclosed herein—is configured to retrieve data records of the tenant data 210 and initiating a syncing of the data records to the target system 204. More specifically, the synchronization engine 218 may retrieve data records from the datastore(s) 210 and sync the data records to one or more datastores 230 residing at the target system 204. In example embodiments, the synchronization engine 218 may make an application programming interface (API) call to the target system 204 to initiate the syncing. In some example embodiments, a separate API call may be made for each data record to be synced or a single API call may cover syncing of multiple data records.

Upon successful syncing, the data records may be stored as synced data 232 in the datastore(s) 230. Responsive to successful syncing of a data record, the synchronization engine 218 may store corresponding sync information in a synced data mapping 226. The sync information may include one or more identifiers (e.g., a key-value mapping) that identify the successfully synced data record; a tenant of the multi-tenant system 202 associated with the synced data record; a corresponding entity, such as a subscriber/customer of the target system 204, associated with the synced data record; or the like. In addition, the synchronization engine 218 may store sync failure information in a sync failure list 228. The sync failure information may indicate one or more data records for which syncing was initiated, but which failed to successfully sync.

A self-healing synchronization engine 220 may also reside and execute on the server system 208. The self-healing synchronization engine 220 may be configured to perform various aspects of a subsequent stage of the self-healing data synchronization process described herein. The self-healing synchronization engine 220 may include various sub-engines including, for example, a scanning engine 222 and a sync discrepancy determination engine 224. The scanning engine 222 may be configured to perform a scan of a bin log, for example, to determine all data change events that occurred over a time period corresponding to a selected time horizon (e.g., the past 24 hours). The scanning engine 222 may be further configured to access the datastore(s) 206 and identify, amongst the tenant data 210, a first set of data records corresponding to the identified collection of data change events. The sync discrepancy determination engine 224 may be configured to access the synced data mapping 226 and identify sync information contained therein that is indicative of a second set of data records that successfully synced to the target system 204 over the time period corresponding to the time horizon.

The sync discrepancy determination engine 224 may be further configured to determine a set difference between the first set of data records and the second set of data records, i.e., a third set of one or more data records containing data record(s) present in the first set and absent from the second set (assuming that the third set is not null). The third set of data record(s) represents data record(s) that correspond to data change events that occurred during the time period corresponding to the time horizon, but which the synchronization engine 218 was unaware of, and thus, did not attempt to sync during the initial stage of the self-healing synchronization process. In some example embodiments, the sync discrepancy determination engine 224 may be further configured to identify one or more data records that failed to sync during the time period from sync failure information contained in the sync failure list 228 and exclude any such record(s) from the third set of data record(s). The sync discrepancy determination engine 224 may then send an indication of the third set of data record(s) to the synchronization engine 218, which may be configured to access the data record(s) and initiate a sync of the record(s) to the target system 204. Further details relating to operation of the various engines depicted in FIG. 2A will be described in reference to FIGS. 2B, 2C, 3, and 4 hereinafter. While depicted as executing on the same server system 208, in some example embodiments, the various engines depicted in FIG. 2A may execute on different server systems and/or any given engine may execute in a distributed manner across multiple server systems.

Figure 2B:
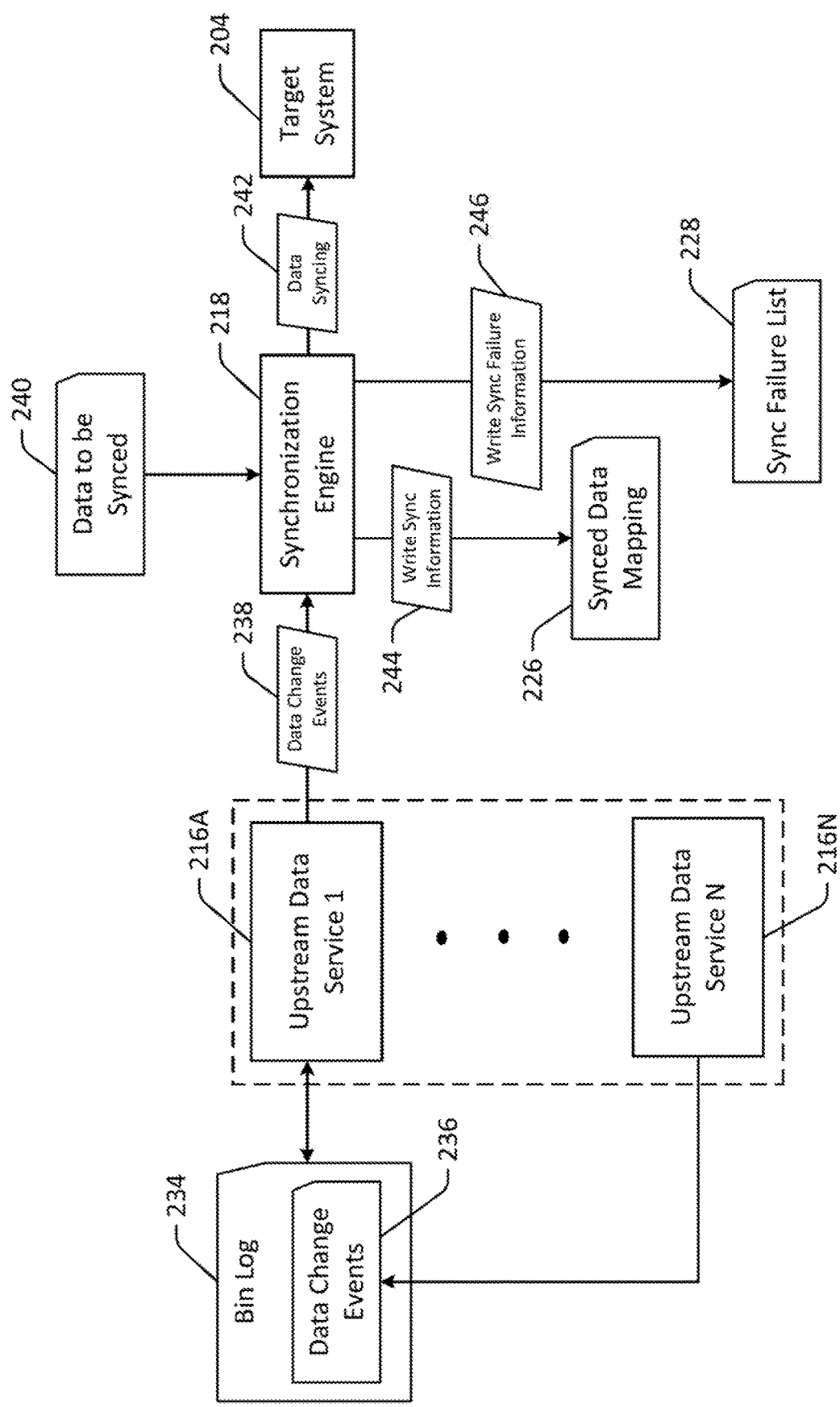
FIG. 2B depicts an initial stage of a self-healing data synchronization process in accordance with example embodiments of the invention.
Figure 3:
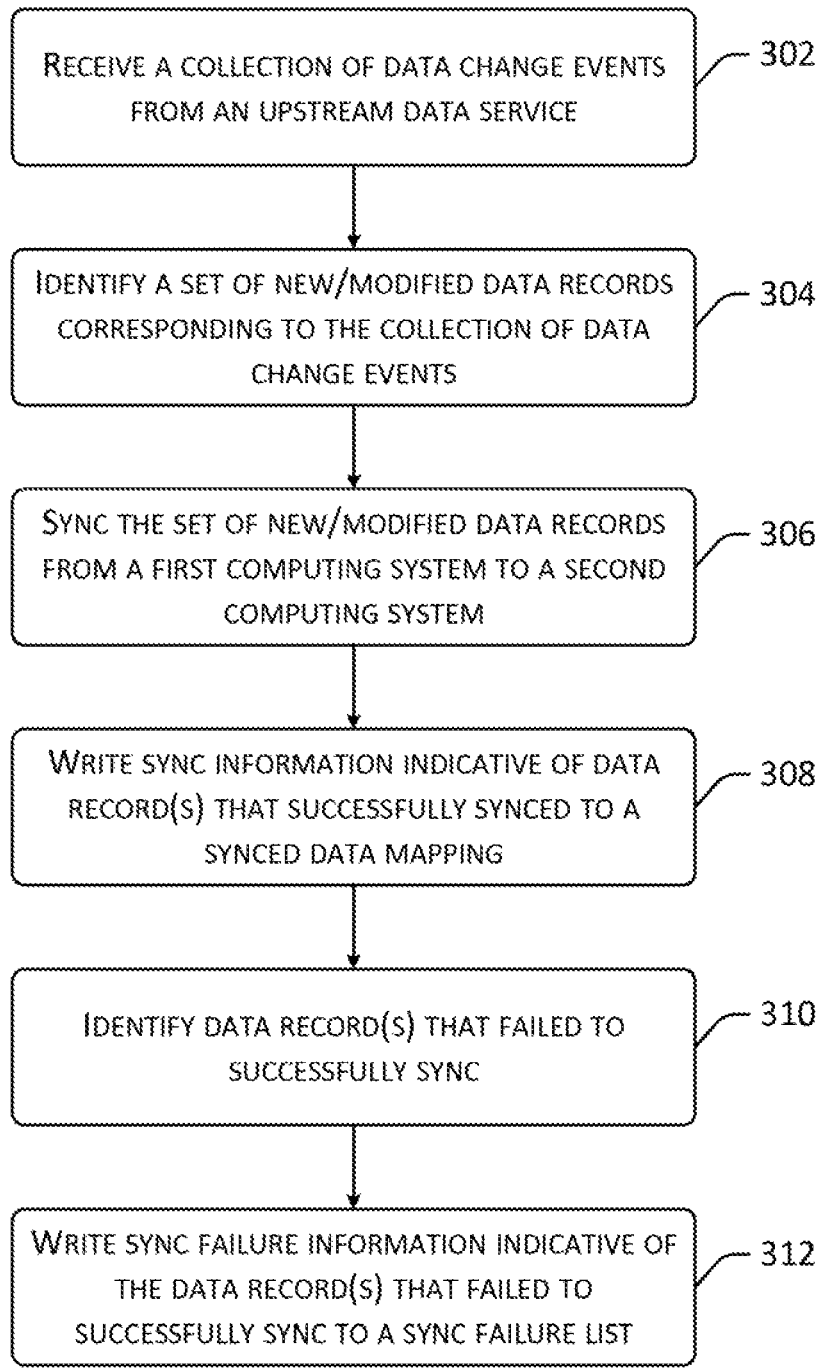
FIG. 3 depicts a flowchart of an illustrative method for performing the initial stage of the self-healing data synchronization process in accordance with example embodiments of the invention.

FIG. 2B depicts an initial stage of a self-healing data synchronization process in accordance with example embodiments of the invention. FIG. 3 depicts a flowchart of an illustrative method 300 for performing the initial stage of the self-healing data synchronization process in accordance with example embodiments of the invention. FIGS. 2B and 3 will be described in conjunction with one another hereinafter.

Referring now to FIG. 3 in conjunction with FIG. 2B, at block 302 of the method 300, the synchronization engine 218 may receive an indication of a collection of data change events 238 from an upstream data service. In example embodiments, the upstream data services 216 (FIG. 2A) may include upstream data services 216A-216N, where N is an integer greater than or equal to one. In example embodiments, a particular upstream data service (e.g., upstream data service 216A) may be configured to periodically monitor a bin log 234 containing a collection of bin log files representative of data change events 236 associated with the tenant data 116 (FIG. 1). More specifically, each bin log file in the bin log 234 may correspond to a particular data change event 236 representing one or more modifications to a data record (e.g., modification of one or more data fields of a data record); creation of a new data record containing one or more data fields; creation of a new data field (and populating the new data field with corresponding data); and/or populating a previously empty existing data field.

In example embodiments, the upstream data service 216A may be configured to continuously monitor the bin log 234 in real time or near real time. In other example embodiments, the upstream data service 216A may periodically query the bin log 234 according to a predetermined query schedule. The upstream data service 216A may send the collection of data change events 238 to the synchronization engine 218 in real time or near real time as the data change events 238 are detected in the bin log 234. In some example embodiments, due to downtime of the upstream data service 216A (planned or unexpected), bugs in the upstream data service 216A, or the like, the upstream data service 216A may fail to detect—over a time period during which the collection of data change events 238 are sent to the synchronization engine 218—one or more of the data change events 236 identified in the bin log 234. As such, these undetected data change event(s) may not be identified among the collection of data change events 238. In other example embodiments, a data change event 236 may go undetected by the upstream data service 216A during the time period during which the collection of data change events 238 are sent to the synchronization engine 218 due to issues impacting one or more other upstream data services 216B-216N. For instance, an upstream data service 216N may be configured to convert the tabular data 214 to the object data 212 (FIG. 2A). The upstream data service 216N may experience downtime, bugs, other processing errors, or the like that result in a delay in bin log files corresponding to data change events being generated and stored in the bin log 234. It should be appreciated that the above examples of causes for discrepancies between the collection of data change events 236 in the bin log 234 that occurred over a given time period and the collection of data change events 238 that the synchronization engine 218 is informed of over the same time period are merely illustrative and not exhaustive.

At block 304 of the method 300, the synchronization engine 218 may identify a set of data records 240 stored at a first computing system that correspond to the collection of data change events 238 received from the upstream data service 216A. For instance, the collection of data change events 238 may include identifiers of the corresponding data records that were created/modified in connection with the data change events 238. In example embodiments, the synchronization engine 218 may identify the data records to be synced 240 from the tenant data 212 stored in the datastore(s) 206 (FIG. 2A) residing at the multi-tenant system 202.

At block 306 of the method 300, the synchronization engine 218 may initiate a syncing 242 of the data records 240 to a second computing system (e.g. the target system 204). In some example embodiments, the synchronization engine 218 may make one or more API calls to the target system 204 to initiate the syncing of the data records 240.

At block 308 of the method 300, the synchronization engine 218 may generate and write sync information 244 to the synced data mapping 226. The sync information 244 may identify those data record(s) that were successfully synced to the target computing system 204. The synced data mapping 226 may identify each data record that was successfully synced using, for example, a key-value mapping that links an identifier of the successfully synced data record, an identifier at the multi-tenant computing system 202 for a tenant with which the synced data record is associated, and/or an identifier at the target system 204 for a subscriber/entity associated with the synced data record. In some example embodiments, the synced data mapping 226 may be indexed by the data record identifier.

In some example embodiments, attempted syncs of one or more of the data records 240 may fail during this initial stage of the self-healing data synchronization process. These attempted syncs may fail due to issues associated with the target computing system 204 (e.g., downtime of the target system 204, a bug affecting the target system 204, etc.). At block 310 of the method 300, the synchronization engine 218 may identify any of the data record(s) 240 that failed to successfully sync, and at block 312 of the method 300, the synchronization engine 218 may write sync failure information 246 indicative of those data record(s) that failed to successfully sync to the sync failure list 228.

As previously noted, as part of the initial stage of the self-healing data synchronization process, the synchronization engine 218 may identify the data records to be synced 240 based on a collection of data change events 238 received on a real time or near real time basis and initiate syncing of the identified data records 240 on a real time or near real time basis. However, due to various potential issues with one or more of the upstream data services 216A (e.g., downtime, bugs, processing errors, etc.), one or more actual data change events 236 may go undetected, and thus, the synchronization engine 218, which is unaware of any such data change event(s), may fail to initiate synchronization of corresponding data records. This is addressed during a subsequent stage of the self-healing data synchronization process.

Figure 2C:
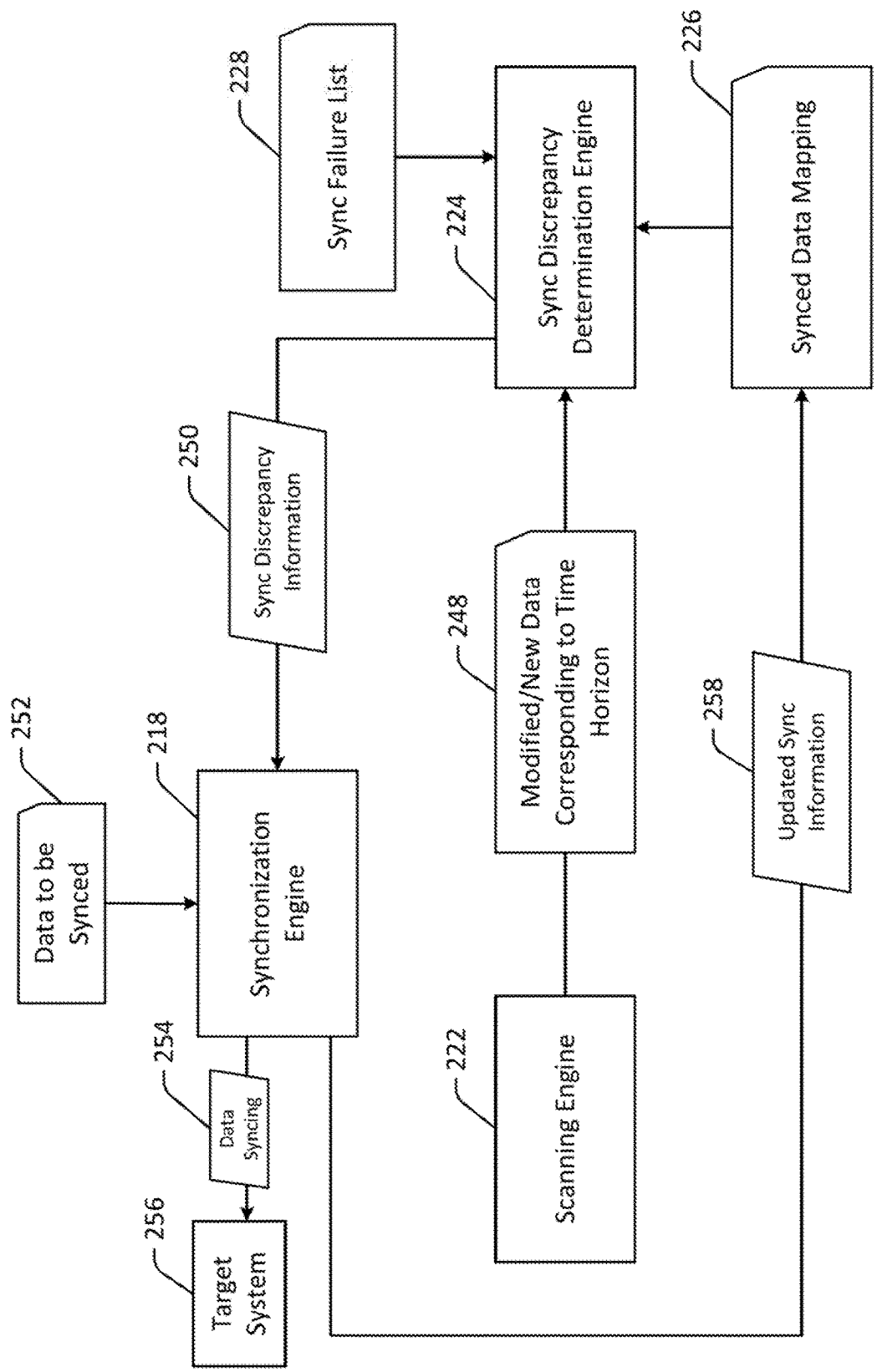
FIG. 2C depicts a subsequent stage of the self-healing data synchronization process in accordance with example embodiments of the invention.
Figure 4:
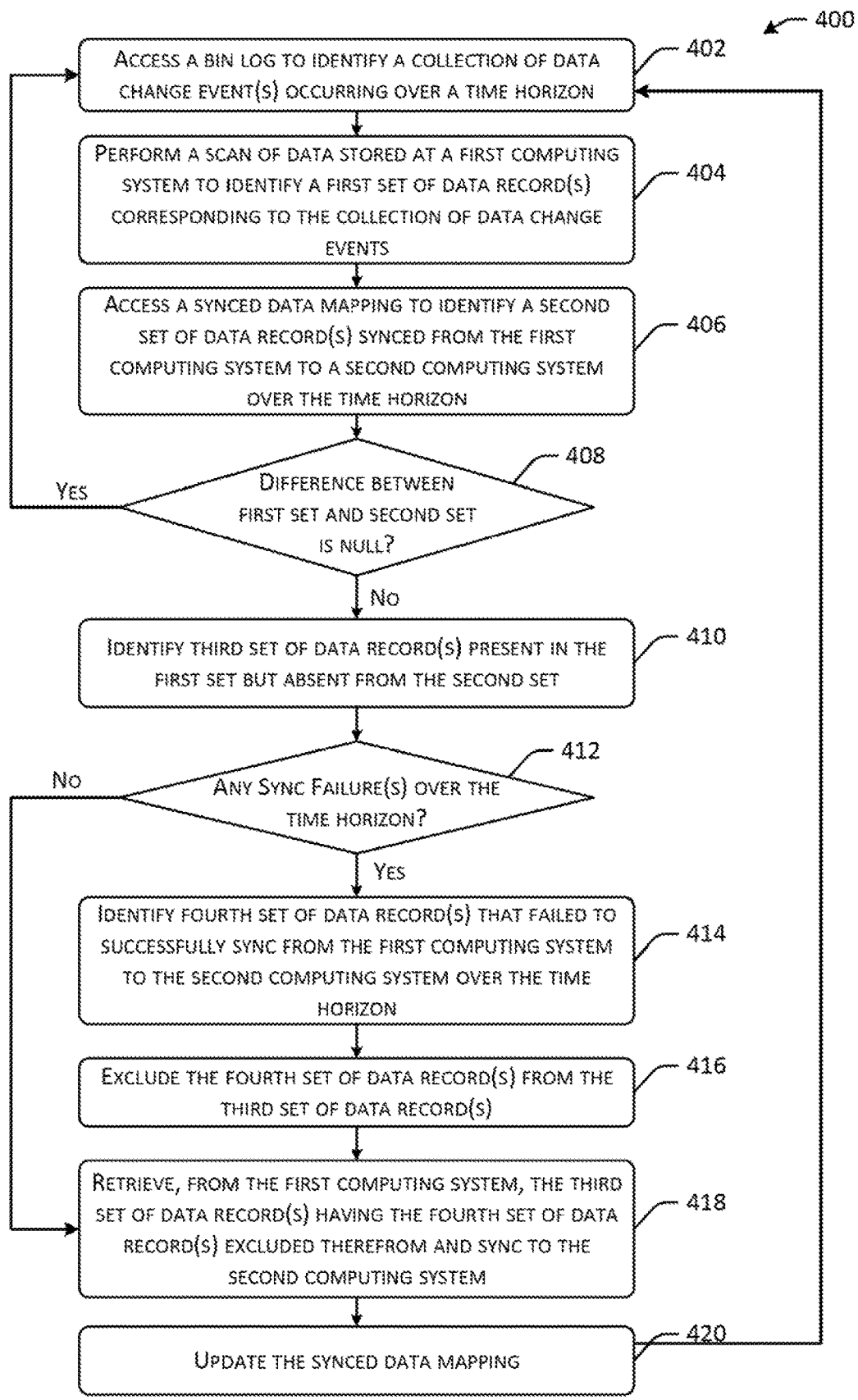
FIG. 4 depicts a flowchart of an illustrative method for performing the subsequent stage of the self-healing data synchronization process in accordance with example embodiments of the invention.

FIG. 2C depicts a subsequent stage of the self-healing data synchronization process in accordance with example embodiments of the invention. FIG. 4 depicts a flowchart of an illustrative method 400 for performing the subsequent stage of the self-healing data synchronization process in accordance with example embodiments of the invention. FIGS. 2C and 4 will be described in conjunction with one another hereinafter.

At block 402 of the method 400, the scanning engine 222 may access the bin log 234 to identify the collection of data change events 236 that occurred over a period of time corresponding to a selected time horizon. More specifically, in example embodiments, the scanning engine 222 may perform a scan of the bin log 234 to determine the collection of data change events 236. In particular, the scanning engine 222 may order the bin log files contained in the bin log 234 based on respective timestamps of the corresponding data change events and may identify the collection of data change events 236 that occurred during the time period corresponding to the time horizon (e.g., during the preceding 24 hours). The time horizon may correspond to any suitable period of time (e.g., 24 hours, 12 hours, 1 hour, etc.). The time horizon may be selectively configurable. In some example embodiments, a user may manually select the time horizon. In other example embodiments, the time horizon may be automatically and dynamically determined based on one or more metrics such as a number of data records that were attempted to be synced over a time period corresponding to the time horizon, a number of data records that successfully synced over the time period, a number of data records that failed to sync over the time period, and so forth.

At block 404 of the method 400, the scanning engine 222 may scan the tenant data 210 (FIG. 2A) to identify a first set of data records 248 corresponding to the identified collection of data change events 236. In example embodiments, the first set of data records 248 may include any of the tenant data 210 that was modified or created as a result of the data change events 236. The scanning engine 222 may provide an indication of the identified first set of data records 248 (e.g., data record identifiers) to the sync discrepancy determination engine 224.

At block 406 of the method 400, the sync discrepancy determination engine 224 may access the synced data mapping 226 to identify a second set of data record(s) that were successfully synced by the synchronization engine 218 during the time period corresponding to the time horizon. Then, at block 408 of the method 400, the sync discrepancy determination engine 224 may compare the first set of data records 248 to the second set of data records identified in the synced data mapping 226 to determine whether the set difference between the two sets is null.

In some example embodiments, the synced data mapping 226 may be cleaned/refreshed (e.g., all sync information stored therein may be deleted) after each subsequent stage of the self-healing synchronization process. As such, the synced data mapping 226 may only contain sync information corresponding to data records that were successfully synced over the course of a time period corresponding to the selected time horizon, in which case, the sync discrepancy determination engine 224 may perform a direct comparison of the first set of data records to a second set of successfully synced data records identified in the synced data mapping 226 to identify a difference there between. In other example embodiments, the synced data mapping 226 may store sync information corresponding to successfully synced data records over a time period that extends beyond the selected time horizon, in which case, the sync discrepancy determination engine 224 may first order the sync information based on respective timestamps indicative of when corresponding data records were successfully synced and select, as the second set of data records, those data records that were successfully synced during a time period corresponding to the selected time horizon.

In response to a positive determination at block 408 indicating that the set difference between the first set of data records and the second set of data records is null, the method 400 may proceed iteratively from block 402 during a next iteration of the subsequent stage of the self-healing data synchronization process. In particular, a positive determination at block 408 indicates that all data records that should have been synced during the time period corresponding to the time horizon were, in fact, successfully synced (or resulted in sync failure as will be described in more detail later in this disclosure), in which case, there is no need to proceed further with the self-healing data synchronization process. Rather, the method can resume again from block 402 during the next iteration of the subsequent stage of the self-healing data synchronization process.

On the other hand, in response to a negative determination at block 408, the method 400 may proceed to block 410, where the sync discrepancy determination engine 224 may identify a third set of data records corresponding to the non-null set difference between the first set of data records 248 (e.g., the set of data records associated with all data change events 236 that occurred during the time period corresponding to the time horizon) and the second set of data records (e.g., the set of data records successfully synced during the time period corresponding to the time horizon). The third set of data records being non-null indicates that either syncing was not initiated for one or more data records for which syncing should have been initiated during the time period corresponding to the time horizon or that syncing was initiated for the one or more data records but failed.

At block 412 of the method 400, the sync discrepancy determination engine 224 may access the sync failure list 228 to identify any data record(s) that were attempted to be synced during the time period corresponding to the time horizon but which failed to sync. In response to a positive determination at block 412, the method 400 may proceed to block 414, where the sync discrepancy determination engine 224 may identify a fourth set of one or more data records that failed to successfully sync over the time period corresponding to the time horizon. Then, at block 416 of the method 400, each data record in the fourth set of data record(s) may be excluded/removed from the third set of data record(s). The sync discrepancy determination engine 224 may then send sync discrepancy information 250 to the synchronization engine 218. The sync discrepancy information 250 may indicate each data record in the third set of data record(s).

In particular, at block 416, any data record(s) identified in the sync failure list 228 as having failed to successfully sync during the time period corresponding to the time horizon (i.e., the fourth set of data record(s)) that are also present in the third set of data record(s) (where the third set of data records represents the difference between the first set of data records corresponding to all data change events 236 over the time period corresponding to the time horizon and the second set of data record(s) corresponding to all successfully synced data record(s) over the time period), may be excluded/removed from the third set of data record(s) such that the sync discrepancy information 250 is indicative of each data record in the third set of data record(s) after the fourth set of data record(s) have been removed therefrom. It should be appreciated that, while not depicted explicitly in the flowchart of FIG. 4, the example method 400 may include a check as to whether the third set of data record(s) is non-null after removing the fourth set of data record(s) therefrom. That is, the example method 400 may perform a check to ensure that the third set of data record(s) and the fourth set of data record(s) are not identical. In particular, in some example embodiments, a sync may have, in fact, been attempted for every data record in the third set (e.g., every data record that should have been synced during the time period corresponding to the time horizon but for which there is no indication in the synced data mapping 226 that the record was successfully synced), but each such sync failed. In such a scenario, because re-syncing of any data record that failed to successfully sync during the initial stage of the self-healing data synchronization process may not be attempted again during the subsequent stage of the self-healing data synchronization process, the method 400 may return to block 402 to iteratively resume during the next subsequent stage of the self-healing data synchronization process.

Assuming that the third set of data record(s) is non-null after excluding the fourth set of data record(s) there from, the synchronization engine 218 may, at block 418 of the method 400, retrieve, from among the tenant data 210 (FIG. 2A), the third set of data record(s) 252 identified in the sync discrepancy information 250 and initiate syncing 254 of the third set of data record(s) to a target system 256 (e.g., the target system 204 depicted in FIG. 2A). In this manner, a self-healing data synchronization is achieved, whereby data record(s) that were modified or created during the time period corresponding to the time horizon, but for which syncing was not attempted, are identified and syncing is initiated for such data record(s). As previously noted, these data record(s) may not have been identified because the synchronization engine 218 may have been unaware of the corresponding data change event(s) due to various technical issues (e.g., downtime, bugs, processing errors, etc.) that may have affected one or more of the upstream data services 216A-216N (FIG. 2B). This self-healing data synchronization process thus obviates the technical problem of data inconsistency between a first computing system (e.g., the multi-tenant system 202 depicted in FIG. 2A) and a second computing system (e.g., the target system 204 depicted in FIG. 2A) that would otherwise result from these various technical issues that may have impacted one or more of the upstream data services 216A-216N.

Finally, at block 420 of the method 400, the synchronization engine 218 may update the synced data mapping 226. In some example embodiments, updating the sync data mapping 226 may include clearing/refreshing/cleaning the synced data mapping 226 by deleting sync information associated with the time period corresponding to the selected time horizon. Further, in certain example embodiments, the synchronization engine 218 may write updated sync information 258 to the synced data mapping 226. The updated sync information 258 may indicate each data record in the third set of data record(s) that was successfully synced. In some example embodiments, the updated sync information 258 may include a flag, an identifier, a code, or the like that indicates that the data record(s) identified therein were synced as part of a subsequent stage of the self-healing synchronization process and not as part of the initial stage so that the information is not evaluated in connection with later iterations of the self-healing synchronization process. In such example embodiments, the updated sync information 258 may be stored to provide a source dataset for calculating one or metrics indicative of the frequency/likelihood of sync discrepancies occurring. Alternatively, in other example embodiments, the updated sync information 258 may not be stored in the synced data mapping 226.

Hardware Implementation

Figure 5:
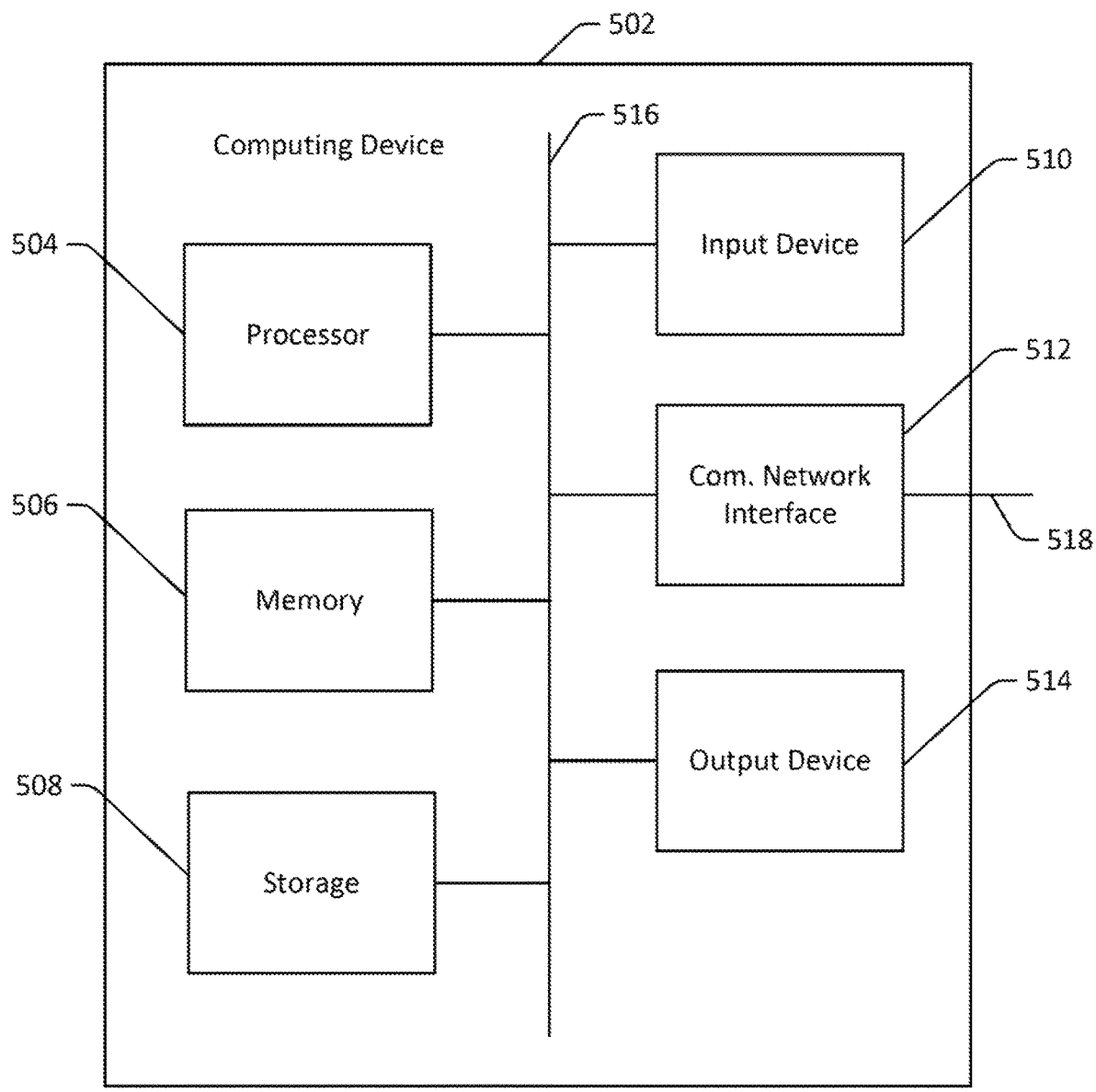
FIG. 5 is a diagram of an example computing device that may form part of a computing system configured to implement features disclosed herein in accordance with example embodiments of the invention.

FIG. 5 depicts a diagram of an example of a computing device 502. Any of the systems, engines, datastores, and/or networks described herein may comprise one or more instances of the computing device 502. In some example embodiments, functionality of the computing device 502 is improved to the perform some or all of the functionality described herein. The computing device 502 comprises a processor 504, memory 506, storage 508, an input device 510, a communication network interface 512, and an output device 514 communicatively coupled to a communication channel 516. The processor 504 is configured to execute executable instructions (e.g., programs). In some example embodiments, the processor 504 comprises circuitry or any processor capable of processing the executable instructions.

The memory 506 stores data. Some examples of memory 506 include storage devices, such as RAM, ROM, RAM cache, virtual memory, etc. In various embodiments, working data is stored within the memory 506. The data within the memory 506 may be cleared or ultimately transferred to the storage 508.

The storage 508 includes any storage configured to retrieve and store data. Some examples of the storage 508 include flash drives, hard drives, optical drives, cloud storage, and/or magnetic tape. Each of the memory system 806 and the storage system 508 comprises a computer-readable medium, which stores instructions or programs executable by processor 804.

The input device 510 is any device that inputs data (e.g., mouse and keyboard). The output device 514 outputs data (e.g., a speaker or display). It will be appreciated that the storage 508, input device 510, and output device 514 may be optional. For example, the routers/switchers may comprise the processor 804 and memory 806 as well as a device to receive and output data (e.g., the communication network interface 512 and/or the output device 514).

The communication network interface 512 may be coupled to a network (e.g., network 108) via the link 518. The communication network interface 512 may support communication over an Ethernet connection, a serial connection, a parallel connection, and/or an ATA connection.

The communication network interface 512 may also support wireless communication (e.g., 802.11 a/b/g/n, WiMax, LTE, WiFi). It will be apparent that the communication network interface 512 may support many wired and wireless standards.

It will be appreciated that the hardware elements of the computing device 802 are not limited to those depicted in FIG. 8. A computing device 802 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 804 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

What is claimed is:

1. A computer-implemented method for syncing data from a first database accessible by a first computing system to a second database accessible by a second computing system, the method comprising:
   receiving a first set of data change events occurring in the first database over a period of time, the first set of data change events possibly failing to include particular data change events occurring in the first database during the period of time;
   storing the first set of data change events in a synchronization store, the first set of data change events corresponding to a first set of data records;
   synchronizing the first data of data records from the first database to the second database;
   reviewing a bin log of the first database to identify a second set of data change events occurring in the first database over the period of time, the second set of data change events corresponding to a second set of data records;
   accessing the synchronization store to retrieve the first set of data change events;
   comparing the second set of data change events against the first set of data change events to determine the particular data change events, the particular data change events corresponding to a third set of one or more data records;
   determining a fourth set of one or more data records that failed to successfully sync to the second database;
   writing sync failure information to a failure store;
   removing the fourth set of one or more data records from the third set of one or more data records; and
   synchronizing the third set of one or more data records from the first database to the second database.

2. The computer-implemented method of claim 1, wherein the receiving the first set of data change events occurs in real time and comes from an upstream data service.

3. The computer-implemented method of claim 2, wherein the upstream data service is configured to convert tabular data to object data, and wherein the particular data change events are due, at least in part, to a data conversion error by the upstream data service.

4. The computer-implemented method of claim 2, further comprising:
   ordering bin log files from the bin log based at least in part on respective timestamps associated with the second set of data change events; and
   identifying each data change event of the second set of data change events having a respective timestamp that falls within the period of time.

5. The computer-implemented method of claim 4, further comprising:
   monitoring, by the upstream data service, the bin log over the period of time to identify the first set of data change events.

6. The computer-implemented method of claim 5, wherein the particular data change events are due, at least in part, to downtime of the upstream data service during at least a portion of the period of time.

7. The computer-implemented method of claim 1, further comprising prior to retrieving the third set of one or more data records:
   accessing the second store to identify the fourth set of one or more data records.

8. The computer-implemented method of claim 1, wherein each data record in the first set of data records are a new data record created during the period of time or a modification to existing data record during the period of time.

9. A system configured to sync data from a first database accessible by a first computing system to a second database accessible by a second computing system, the system comprising:
   at least one processor; and
   at least one memory storing computer-executable instructions, wherein the at least one processor is configured to access the at least one memory and execute the computer-executable instructions to:
     receive a first set of data change events occurring in the first database over a period of time, the first set of data change events possibly failing to include particular data change events occurring in the first database during the period of time;
     store the first set of data change events in a synchronization store, the first set of data change events corresponding to a first set of data records;
     synchronize the first data of data records from the first database to the second database;
     review a bin log of the first database to identify a second set of data change events occurring in the first database over the period of time, the second set of data change events corresponding to a second set of data records;
     access the synchronization store to retrieve the first set of data change events;
     compare the second set of data change events against the first set of data change events to determine the particular data change events, the particular data change events corresponding to a third set of one or more data records;
     determine a fourth set of one or more data records that failed to successfully sync to the second database;
     write sync failure information to a failure store;
     remove the fourth set of one or more data records from the third set of one or more data records; and
     synchronize the third set of one or more data records from the first database to the second database.

10. The system of claim 9, wherein the at least one processor is further configured to execute the computer-executable instructions to:
    receive the first set of data change events occurs in real time and comes from an upstream data service.

11. The system of claim 10, wherein the upstream data service is configured to convert tabular data to object data, and wherein the particular data change events are due, at least in part, to a data conversion error by the upstream data service.

12. The system of claim 10, wherein the at least one processor is further configured to execute the computer-executable instructions to:
  order bin log files from the bin log based at least in part on respective timestamps associated with the second set of data change events; and
  identify each data change event of the second set of data change events having a respective timestamp that falls within the period of time.

13. The system of claim 12, wherein the at least one processor is further configured to execute the computer-executable instructions to:
  monitor, by the upstream data service, the bin log over the period of time to identify the first set of data change events.

14. The system of claim 13, wherein the particular data change events are due, at least in part, to downtime of the upstream data service during at least a portion of the period of time.

15. The system of claim 9, wherein the at least one processor is further configured to execute the computer-executable instructions to:
  access the second store to identify the fourth set of one or more data records.

16. The system of claim 9, wherein each data record in the first set of data records are a new data record created during the period of time or a modification to existing data record during the period of time.

17. A computer program product for syncing data from a first database accessible by a first computing system to a second database accessible by a second computing system, the computer program product comprising a non-transitory computer-readable medium readable by a processing circuit, the non-transitory computer-readable medium storing instructions executable by the processing circuit to cause a method to be performed, the method comprising:
  receiving a first set of data change events occurring in the first database over a period of time, the first set of data change events possibly failing to include particular data change events occurring in the first database during the period of time;
  storing the first set of data change events in a synchronization store, the first set of data change events corresponding to a first set of data records;
  synchronizing the first data of data records from the first database to the second database;
  reviewing a bin log of the first database to identify a second set of data change events occurring in the first database over the period of time, the second set of data change events corresponding to a second set of data records;
  accessing the synchronization store to retrieve the first set of data change events;
  comparing the second set of data change events against the first set of data change events to determine the particular data change events, the particular data change events corresponding to a third set of one or more data records;
  determining a fourth set of one or more data records that failed to successfully sync to the second database;
  writing sync failure information to a failure store;
  removing the fourth set of one or more data records from the third set of one or more data records; and
  synchronizing the third set of one or more data records from the first database to the second database.

* * * * *